United States Patent
West et al.

(10) Patent No.: US 12,231,718 B2
(45) Date of Patent: Feb. 18, 2025

(54) FULL MOTION VIDEO (FMV) ROUTING IN ONE-WAY TRANSFER SYSTEMS USING MODIFIED ELEMENTARY STREAMS

(71) Applicant: Microsoft Technology Licensing, LLC, Redmond, WA (US)

(72) Inventors: Jeffrey A. West, Redmond, WA (US); William Harry Schulden, Laurel, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/342,264

(22) Filed: Jun. 27, 2023

(65) Prior Publication Data
US 2025/0008180 A1    Jan. 2, 2025

(51) Int. Cl.
*H04N 21/434* (2011.01)
*H04N 21/4385* (2011.01)
*H04N 21/643* (2011.01)
*H04N 21/84* (2011.01)

(52) U.S. Cl.
CPC ..... *H04N 21/4348* (2013.01); *H04N 21/4385* (2013.01); *H04N 21/64322* (2013.01); *H04N 21/84* (2013.01)

(58) Field of Classification Search
CPC ........... H04N 21/4348; H04N 21/4385; H04N 21/64322; H04N 21/84
See application file for complete search history.

(56) References Cited

U.S. PATENT DOCUMENTS

| 7,039,048 B1 * | 5/2006 | Monta | H04N 21/2408 725/138 |
| 2004/0172658 A1 * | 9/2004 | Rakib | H04B 7/18584 725/111 |
| 2014/0139737 A1 | 5/2014 | Clarke | |
| 2014/0208420 A1 | 7/2014 | Mraz | |
| 2020/0336808 A1 | 10/2020 | Menoher | |

OTHER PUBLICATIONS

Lee, et al., "Untraceable Blind Packet Forwarding Using Centralized Path Control", In Proceedings of IEEE Military Communications Conference, Oct. 6, 2014, pp. 268-273.
(Continued)

Primary Examiner — Nicholas T Corbo

(57) ABSTRACT

Systems and methods relating to full motion video (FMV) routing in one-way transfer (OWT) systems are described herein. The present technology modifies or adds packetized elementary streams (PESs) of video streams, that are sent from the low-trust side of the OWT system, with a global unique identifier (GUID) that is used as an identifier to determine a particular destination on the high-trust side of the OWT system. The enriched video stream is then transmitted through an OWT system that provide high reliability for the enriched video stream. When the enriched video stream is received on the high-trust side, the GUID from the PES is extracted and used to identify destination addresses for destination devices in the high-trust computing environment. The video stream is then delivered to the destination devices having the corresponding destination addresses.

20 Claims, 9 Drawing Sheets

(56) References Cited

OTHER PUBLICATIONS

Simsek, Irfan, "Blind Packet Forwarding", In dissertation submitted to Institute for Computer Science and Business Information Systems, Aug. 11, 2016, 250 Pages.

Simsek, Irfan, "On-Demand Blind Packet Forwarding", In Proceedings of 30th International Telecommunication Networks and Applications Conference, Nov. 25, 2020, 8 Pages.

International Search Report and Written Opinion received for PCT Application No. PCT/US2024/035681, Sep. 19, 2024, 13 pages.

* cited by examiner

FULL MOTION VIDEO (FMV) ROUTING IN ONE-WAY TRANSFER SYSTEMS USING MODIFIED ELEMENTARY STREAMS

BACKGROUND

In data transfer and communications systems, communication is generally be performed in a two-way manner. For instance, two devices in communication with one another exchange data in both directions. This ability allows for confirmations or acknowledgements that data has been received and processed correctly. In cases where the data is not received for processed correctly, such as due to dropped packets or corrupted data, the receiving device is able to request that the data be retransmitted. In systems where only one-way communication is implemented, no such acknowledgements or requests for the resending of data are available.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods relating to full motion video (FMV) routing in one-way transfer (OWT) systems. The OWT systems include components that restrict the flow of data in a single direction through the system while providing additional reliability enhancements to help ensure that the video stream is handled correctly and is tolerant to faults in the devices of the systems. For example, the system may include a transmitting computing device with an optical transmitter limited to transmit-only functions. The present technology modifies or adds packetized elementary streams (PESs) of video streams, that are sent from the low-trust side of the OWT system, with a global unique identifier (GUID). The GUID is used as an identifier to determine a particular destination on the high-trust side of the OWT system. The enriched video stream is then transmitted through an OWT system that provides high reliability for the enriched video stream. When the enriched video stream is received on the high-trust side, the GUID in the PES is extracted and used to identify destination addresses for destination devices in the high-trust computing environment. The video stream is then delivered to the destination devices having the corresponding destination addresses. As a result, even where the source devices in the low-trust computing environment have no knowledge of destination addresses, video streams can still be properly routed through the OWT and into and within the high-trust computing environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
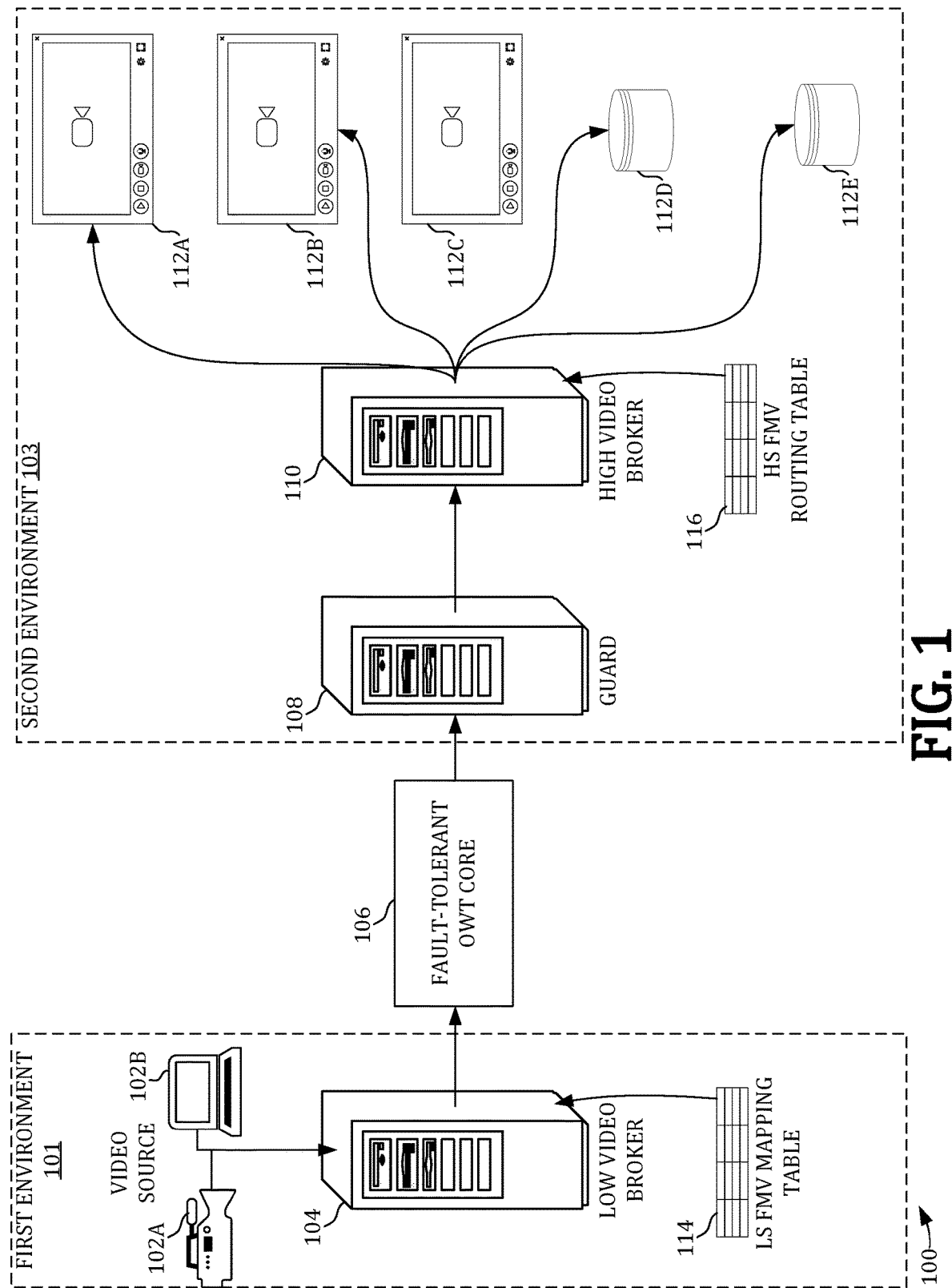
FIG. 1 depicts an example one-way transfer (OWT) system for full-motion video routing.

A one-way transfer system (OWT) refers to a computing system which uses one or more data diodes to ensure that data can only be transferred unidirectionally through the respective computing devices of the computing system. In examples, the data diodes ensure unidirectional data packet transfer through implementation of hardware and/or software components, such as a transmit-only network interface card (NIC).

OWT systems may be used to protect a network or endpoints against outbound data transmissions, malicious inbound data transmissions (e.g., viruses and malware), and cyberattacks. As one example, OWT systems facilitate the transfer of data between an endpoint in a low-trust computing environment (such as the public Internet or other high-threat environment) and an endpoint in a high-trust computing environment (or a higher-security computing environment relative to the low-trust computing environment). In such an example, an OWT system spans or includes multiple computing environments that are separated by one or more boundaries between the low-trust computing environment and the high-trust computing environment.

In examples, a high-trust environment may be a system or network where the devices, applications, and users are considered trustworthy, and security measures are in place to establish and maintain that trust. In this type of environment, the devices and/or parties involved, such as devices, software, and users, are often authenticated, authorized, and/or adhere to established security policies and best practices. High-trust environments usually have rigorous access controls, encryption, and monitoring to ensure that trust is maintained and to minimize the risk of unauthorized access, data breaches, or other security incidents. Devices within high-trust environments may be authorized to access or be accessed by other devices based on security techniques that are implemented by the high-trust environments (e.g., unique encryption keys, secrets, or other cryptographical techniques). For instance, the communications transmitted by a high-trust environment may be considered trustworthy by other computing environments or devices based on the high-trust environment (or devices thereof) being included in an allowlist (e.g., a list of approved devices and/or computing environments). Alternatively, the communications transmitted by a high-trust environment may be considered trustworthy based on a password or credential provided with the communications. In some examples, the devices in a high-trust environment do not require authentication to access or be accessed by other devices. A high-trust environment generally does not expose the security techniques implemented by the high-trust environment to other computing environments, which may be considered low-trust or no-trust environments by the high-trust environment.

By contrast, a low-trust or no-trust environment may be a system or network where the devices, applications, and/or users are not implicitly trusted or where there's a high risk of unauthorized access or malicious activities. This type of environment might have limited or no security measures in place, or the environment may be one where a high number of external or unmanaged devices are connected. Alternatively or additionally, a low-trust or no-trust environment refers to an environment in which the devices are not considered to be secured or trustworthy by other devices within and/or external to the low-trust or no-trust environments. As the security techniques implemented by the high-trust environment are not exposed to low-trust or no-trust environments, low-trust or no-trust environments may not be able to access or communicate with a high-trust environment without performing various authorization and/or authentication steps that need not be performed by devices in high-trust environments.

Due to the unidirectional data transmission of an OWT system, there is no confirmation that data sent over the unidirectional transmission line has been received by the receiving device and/or processed correctly by the receiving device. In contrast, in bi-directional systems, communication protocols such as the Transmission Control Protocol (TCP) may be used where confirmations can be sent back to the transmitting device. For example, with TCP, when a connection is established between two devices, the two devices exchange a series of messages to synchronize and establish the connection parameters. Then, when the transmitting device sends data, the receiving device returns an acknowledgment (ACK) message back to the transmitting device to confirm that it has received the data. If the transmitting device does not receive an ACK within a certain amount of time, the transmitting device will resend the data. With OWT systems, no such ACK messages are possible because communications cannot be sent back to the transmitting device from the receiving device. Instead, unidirectional communication protocols have to be used for communication, such as the User Datagram Protocol (UDP). As a result, there must be robust systems in place to help ensure that the data transmitted from the transmitting device is actually received and properly handled by the receiving device. If no such systems are in place, the reliability of the system would be significantly reduced.

In addition, also due to the OWT scenario and separation of the low-trust environment from the high-trust environment, the ultimate destination is not known to the source devices in the low-trust environment. For instance, when a video stream from the low side is desired to be sent to a particular destination in the high side, the actual address of that destination device is generally unknown to the low side devices due to the IP address being confidential or protected from the device in the low side. As a result, only the devices within the high-trust environment may have access to the destination address, and routing data from the low side to the high side becomes particularly challenging as the routing is effectively blind. For instance, video source device knows the address of another intermediary device on the low side, but the video source has no knowledge of the address of the ultimate destination. Moreover, the intermediate device may also have no knowledge of the ultimate destination addresses. These challenges are exacerbated for live video streams that do not have a discrete package length (e.g., an unknown end time) where routing must be continuously managed throughout the unknown duration of the video stream.

The present technology provides solutions to the above problems by inserting the routing data into the video stream itself. For instance, the MPEG-TS stream is generally made up of a series of packetized elementary streams (PESs), such as different audio, video, and metadata PESs that are multiplexed together to form the transport stream. In some examples, the metadata PESs may include data such as key-length-value (KLV) data or the like. With the technology disclosed herein, the metadata PESs are modified by a low-side device to incorporate the routing data, or a new routing PES is generated and incorporated into the video stream to generate an enriched video stream by multiplexing the modified or added PESs. The routing data includes a global unique identifier (GUID) that is also used as an identifier for a particular destination on the high side. The enriched video stream is then transmitted through an OWT system that provides high reliability for the enriched video stream. When the enriched video stream is received on the high side, the enriched video stream is demultiplexed and the routing data (e.g., GUID) is extracted from the modified metadata PES or the added routing PES. The GUID is used to identify a destination address from a routing table accessible to the high side device receiving the enriched video stream. The video stream is then delivered to the destination devices having the corresponding source addresses. As a result, even where the source devices have no knowledge of destination addresses, video streams can still be properly routed through the OWT system and then into and within the high-trust computing environment.

FIG. 1 depicts an example OWT system 100 for full-motion video routing. System 100, as presented, is a combination of interdependent components that interact to form an integrated whole. Components of system 100 may be hardware components or software components (e.g., application programming interfaces (APIs), modules, runtime libraries) implemented on and/or executed by hardware components of system 100. In one example, components of system 100 are distributed across multiple processing devices or computing systems.

System 100 represents an OWT system for transmitting video streams between different computing environments. System 100 includes a first computing environment 101 and a second computing environment 103. In some examples, computing environments 101, 103 are implemented in a cloud computing environment or another type of distributed computing environment and are subject to one or more distributed computing models/services (e.g., Infrastructure as a Service (IaaS), Platform as a Service (PaaS), Software as a Service (Saas), Functions as a Service (FaaS)). In some examples, each environment is a separate network or sub-network.

Although FIG. 1 is depicted as including a particular combination of computing environments and devices, the scale and structure of devices and computing environments described herein may vary and may include additional or fewer components than those described in FIG. 1. Further, although examples presented herein will be described in the context of OWT systems and data transfers between low-trust computing environments and high-trust computing environments, the examples are also applicable to other types of data transfers between computing environments of various (or the same) types and security levels. For instance, the first environment 101 may also be referred to as a source environment and the second environment 103 may be referred to as a destination environment.

The first environment 101 includes a video source, such as a video source 102, such as a source camera 102A or another computing device 102B that generates video data (such as shared screens, computer-generated videos, etc.). The source camera 102A may be any type of camera capable of capturing and streaming video data, such as drone cameras, security cameras, body-worn cameras, etc. The first environment also includes a source video broker 104 (which may be referred to as a low video broker 104 in the present example) that accesses or stores a low-side FMV mapping table 114. Video streams are transmitted from the low video broker through a fault-tolerant OWT core 106, where the video streams are received by a guard 108 of the second environment 103. The guard 108 transmits the video stream to the destination video broker 110 (which may be referred to as a high video broker 110 in the present example) in the second environment 103 that accesses or uses a high-side FMV routing table 116. The high video broker 110 uses the high-side FMV routing table 116 to identify destination addresses of one or more destinations, such as high-side destinations devices 112A-E in the second computing environment 103. The high-side destination devices 112A-E may include devices such as display devices 112A-C to display the video stream and/or a storage devices 122D-E to store the video stream. Other types of destination devices 112 may also be possible, such as devices that process and/or analyze the video stream that is received.

The first computing environment 101 may represent a low-trust computing environment in which devices executing within computing environment 101 are not trusted by devices executing within the second computing environment 103. In such examples, the first computing environment 101 may be physically separated from the second computing environment 103 such that the first computing environment 101 is in a first physical location (e.g., region, building, room, and/or server rack) and the second computing environment 103 is in one or more other physical locations. Alternatively, in other examples, the computing environments 101, 103 are all located in the same physical location.

The video source 102 captures or generates video that is converted to a video stream that may have various formats. As one example, the video stream is in a Moving Picture Experts Group (MPEG)-Transport Stream (TS) format. In other examples, the video stream is in a Real Time Transport Protocol (RTP) format, a Real Time Streaming Protocol format (RTSP), or another similar format.

The video stream is then received by the low video broker 104. The low video broker 104 is a computer device, such as a server, that processes the received video streams and enriches the video streams. To enrich the video stream, the low video broker 104 adds routing data to the video stream itself by modifying a PES of the video stream or adding a PES to the video stream. The routing data that is added to the PES of the video stream is based on the low-side FMV mapping table 114.

The low-side FMV mapping table 114 includes data from users (e.g., customers) or administrators in the second environment 103. For instance, when a new source-to-destination (e.g., low-to-high) video stream is requested, a virtual machine is provisioned to receive and process the new video stream on a specific IP address and port, which may be referred to as an ingress IP address and/or ingress port. The GUID, ingress IP address, and ingress port for that new video stream may be provisioned in the low-side FMV mapping table 114. The data in the low-side FMV mapping table 114 indicates a particular GUID, also referred to herein as a Dataflow ID, for each video stream that is to be received by the low video broker 104. For instance, a particular GUID may be assigned for each ingress IP address and port on which a particular data stream is received. The low video broker 104 then monitors for video feeds on the assigned ports or from the assigned IP addresses. When the video stream is received on a particular IP address and port, a PES of the video stream is modified to include, or a new PES is generated that includes, the corresponding GUID in the low-side FMV mapping table 114 and high-side routing table 116. As discussed further below, the high video broker 110 uses the GUID to identify a particular endpoint (e.g., destination devices 112). Accordingly, there is a 1:1:1 mapping between the endpoint, the video stream, and the GUID. The modified PES or added PES is then multiplexed with the other PESs of the video stream to form an enriched video stream. Additional details regarding the PESs and multiplexing those PESs is provided below with respect to FIGS. 2A-D.

Once the enriched video stream is generated by the low video broker 104, the enriched video stream is transmitted to the fault-tolerant OWT core 106. For instance, the low video broker 104 may route the enriched video stream to a particular IP address or port of the fault-tolerant OWT core 106. The low video broker 104 continues to generate the enriched video stream as long as the video stream continues to be received by the low video broker 104.

The fault-tolerant OWT core 106 receives the enriched video stream and transmits the enriched video stream to the guard 108. An example of a fault-tolerant OWT core 106 is discussed in more detail below with reference to FIG. 3. The guard 108 protects the second computing environment 103 from data entering the second computing environment 103 from the first computing environment 101. The guard 108 performs changes and/or checks to the enriched video stream. For instance, the guard 108 may transcode the enriched video stream. Alternatively or additionally, the guard 108 performs security checks or policy enforcement on the video stream to remove malicious data or remove any other types of data according to a policy set by the administrator of the second computing environment 103. As an example, the guard 108 performs schema enforcement for data, such an enforcing a schema of a particular video stream format. If the enriched video stream meets the criteria set forth by the guard 108, the guard 108 further transmits the enriched video streams to the high video broker 110.

The guard 108 may have a fixed set of video channels, and there may be about 10 video channels per graphics processing unit (GPU) of the guard 108. A given video channel may have a static input port and a static destination. The static input port receives a particular video stream, and that particular video channel may continue to handle the video stream for the duration of the stream. The static destination for all the video channels of the guard 108 may be one or more ports of the high video broker 110 such that all the video streams from the guard 108 are provided to the high video broker 110. Accordingly, the guard 108 itself does not need to know or determine the ultimate destination for the video stream in the second environment 103. Instead, as discussed below, the high video broker 110 uses the routing data from the metadata PES of the enriched video stream and application logic to ultimately route the video streams to their final destinations.

The high video broker 110 demultiplexes the enriched video stream to allow for inspection of the metadata PES (e.g., the modified PES or the added ES) including the routing data (e.g., the GUID). The high video broker 110 then identifies the GUID from the metadata PES of the enriched video stream. The high video broker 110 then accesses the high-side FMV routing table 116 to determine an IP address or port for the destination device(s) 112 for the video stream. For instance, the high video broker 110 may perform a lookup operation or query against the high-side FMV routing table 116 with the GUID, which returns one or more destination addresses.

Once the routing data has been identified from the metadata PES, the PESs of the enriched video stream are returned to their original form prior to the enrichment of the video stream. For instance, where an original metadata PES was modified to incorporate the routing data, the routing data may be removed from the metadata PES of the enriched video stream to then re-create the original video stream. In examples where a new metadata PES is added by the low video broker 104, that new metadata PES is removed to allow for the original video stream to be re-created.

The re-created original video stream is then transmitted to the destination device(s) 112 by the high video broker 110. The re-created original video stream may also be referred to herein as an unenriched video stream. Transmitting the unenriched video stream may include sending the packets of the video stream to the identified IP address and/or from the identified port. Because the high video broker 110 and the destination devices 112 are in the same second environment 103, bi-directional communication, such as TCP, may be used for the transmission of the video streams from the high video broker 110. The destination device(s) 112 then display, store, and/or process the live video stream for the duration of the video stream.

Figure 2A:
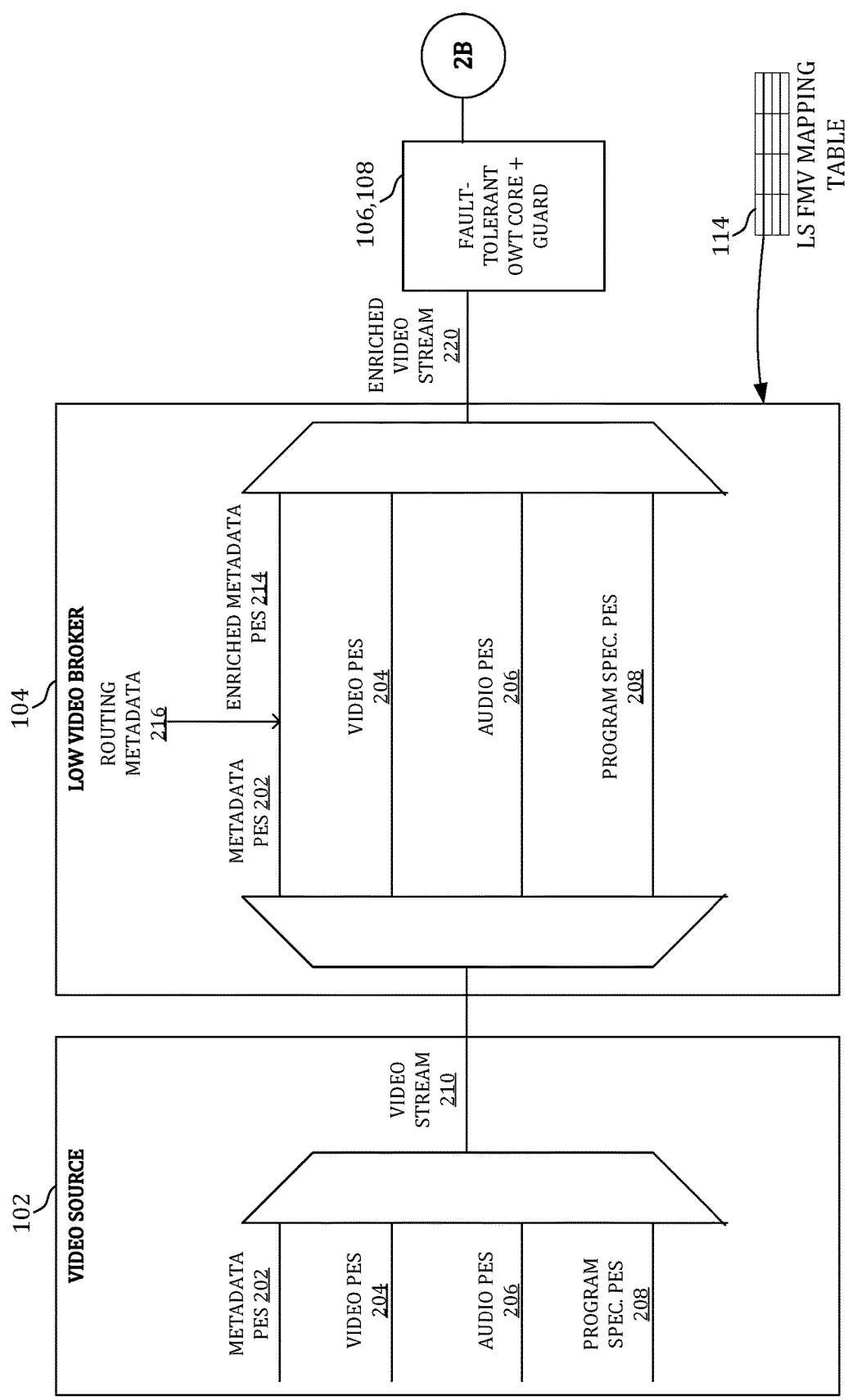
FIGS. 2A-2B depicts an example system for modifying elementary streams of a video stream with routing data.
Figure 2B:
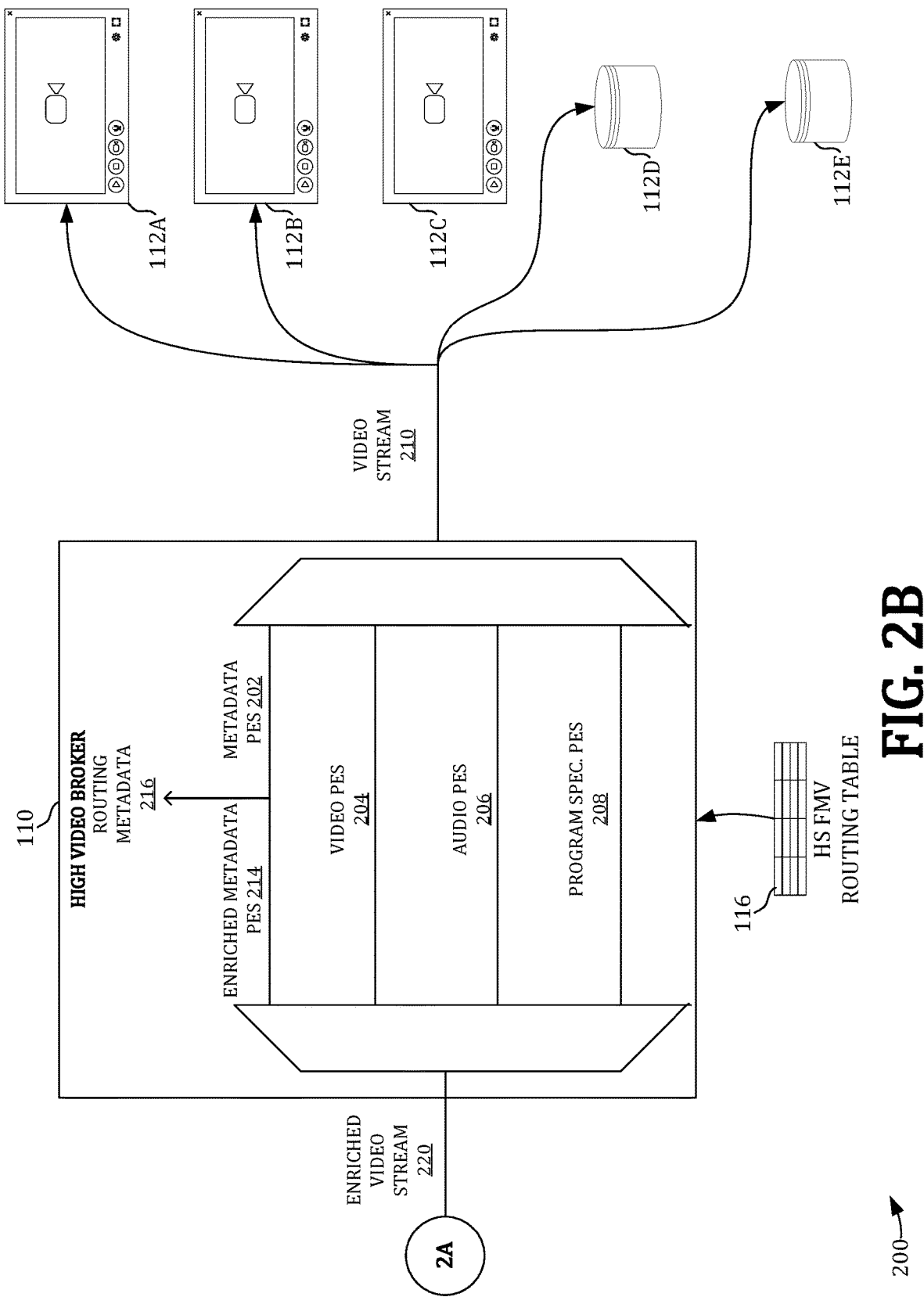

FIGS. 2A-2B depicts an example system 200 for modifying PESs of a video stream with routing data. The example system 200 may include the same components as the system 100 discussed above. The system 200 incorporates routing data into the video stream by modifying a PES of the video stream as discussed below.

The video source 102 generates a video stream 210 by multiplexing multiple PESs. For example, the video source 102 may utilize a metadata PES 202, a video content PES 204, an audio PES 206, and a program specific PES 208. In practice, the PESs may include many more than the PESs discussed herein. For example, the video content PES 204 may actually include multiple video PESs and the audio PES 206 may include multiple audio PESs. However, for clarity of discussion herein, only 4 PESs are discussed in this example.

The metadata PES 202 includes metadata for the video stream 210. Each of the KLV packets includes three parts: a key, a length, and a value. The key identifies the kind of data that is included in the value field, and may be similar to a tag or label for the data. The length field specifies the length of the value data in bytes. This allows a parser to know how much data to read for the value. The value field is the actual metadata information or data payload. KLV data may be used in broadcast environments and/or military and surveillance applications, where having rich metadata associated with the audio and video data may be important or useful. While KLV data provides a standardized way to encode metadata, the specific keys used and the interpretation of the value data can vary widely between different systems and applications. For instance, the value data may include a wide range of information, from simple things like the title and duration of a program, to more complex data like geolocation information, flight tail numbers, scene descriptions, camera angles, and so on.

The video content PES 204 includes the actual video content, and the audio PES 206 includes the audio content. The program specific PES 208 includes data for interpreting and identifying the different PESs that form the video stream 210. The program specific PES 208 includes data such as program association table (PAT), a program map table (PMT), among other types of data about the video stream 210 itself. The PAT identifies each program within a transport stream where multiple programs are available. For instance, each program is identified by a Program Number and is associated with the Packet ID (PID) of its corresponding PMT. Each program in the MPEG-TS has a corresponding PMT. The PMT provides information about the programs PESs. It identifies the type of each stream (e.g., whether the PES is audio or video, and what coding standard is used) and provides the Packet ID (PID) for each stream.

As the data for the PESs is generated, the respective PESs are multiplexed by the video source 102 to form the video stream 210. For instance, the metadata PES 202, the video content PES 204, the audio PES 206, and the program specific PES 208 are multiplexed to form the video stream 210. The video stream 210 is then transmitted to the low video broker 104.

The low video broker 104 demultiplexes the video stream 210 to access the individual PESs of the video stream 210 (e.g., the metadata PES 202, the video content PES 204, the audio PES 206, and the program specific PES 208). The low video broker 104 then modifies the metadata PES 202 to incorporate routing data 216. The modified metadata PES 202 that includes the routing data 216 may be referred to as an enriched metadata PES 214.

The routing data 216 may include the GUID from the low-side FMV mapping table 114. For instance, as discussed above, when the video stream 210 is received by the low video broker 104, the low-side FMV mapping table 114 may be queried based on the ingress port and/or ingress IP address of the video stream 210 to retrieve the GUID for video stream 210. A field or value of the metadata PES 202 may then be modified to incorporate the GUID.

The particular field that is to be modified may also be defined in the low-side FMV mapping table 114. For instance, for KLV data, the low-side FMV mapping table 114 may define which key is to be modified to incorporate the routing data 216. The particular key may be configurable by a customer or administrator when requesting or configuring new source-to-destination (e.g., low-to-high) video streams. As discussed further below, the high-side mapping table 116 may have an equivalent entry that indicates where the routing data exists in the KLV data.

Once the enriched metadata PES 214 has been formed, the PESs are multiplexed to form an enriched video stream 220. For example, the low video broker 104 multiplexes the enriched metadata PES 214, the video content PES 204, the audio PES 206, and/or the program specific PES 208 to form the enriched video stream 220. The enriched video stream 220 is then transmitted through the fault-tolerant OWT core 106 and the guard 108, and the enriched video stream 220 is received by the high video broker 110 (FIG. 2B).

The high video broker 110 demultiplexes the enriched video stream 220 to access the PESs of the enriched video stream 220. The enriched video stream 220 then inspects the enriched metadata PES 214 to identify the routing data 216 stored in the enriched metadata PES 214. For example, the high video broker 110 may inspect a value for a particular key of the KLV data in the enriched video stream 220.

In some examples, the particular key to be inspected in the KLV data may be indicated in the high-side mapping table 116. In other examples, the particular field or key containing the routing data 216 may not be known to the high video broker 110. For instance, while the high-side mapping table 116 may indicate a particular KLV key for the routing data, that particular key is only for a particular GUID. The GUID for an incoming stream, however, is not known until it is identified from the enriched video stream 220. As such, the high video broker 110 may not know the field to inspect prior to identifying the GUID.

In such examples, the routing data 216 may include a unique string or data that indicates the GUID follows that unique string. As one example, the unique string may be "MSFT" or similar string of letters. The high video broker 110 may then inspect all the fields of the KLV data until the unique string of MSFT is identified. The GUID is then extracted as the data following the unique string of MSFT in the field. In yet other examples, pointer data may follow the unique string to indicate a different key or field of the KLV data where the GUID is stored. For example, the data following MSFT may indicate a different key of the KLV data. The value for that key is then inspected by the high video broker 110 to extract the GUID.

Once the routing data 216 is extracted, the routing data 216 may be removed from the enriched metadata PES 214 to return the enriched metadata PES 214 to the metadata PES 202. In some examples, the insertion of the routing data 216 by the low video broker 104 may have overwritten original data in the corresponding metadata or KLV fields. In such examples, removal of the routing data 216 may not return to the enriched metadata PES 214 to its exact original form as the original data that was overwritten is not known to the high video broker 110. As such, the metadata PES 202 after having the routing data 216 removed may be referred to as an unenriched metadata PES 202.

The PESs are then again multiplexed to form an unenriched video stream 210, which may be the same as the original video stream 210 received by the video source 102 by the low video broker 104. For example, the high video broker 110 multiplexes the unenriched metadata PES 202, the video content PES 204, the audio PES 206, and the program specific PES 208 to form the unenriched video stream 210.

The high video broker 110 also identifies a destination address (e.g., IP address and/or port) for the video stream 210 based on the extracted GUID and an FMV routing table 116. For example, the high video broker 110 may query the FMV routing table 116 with the extracted GUID, and in response to the query, receive the destination address(es) of the destination device(s) 112 for the video stream 210. The high video broker 110 then transmits the unenriched video stream 210 to the destination address(es) of the destination device(s) 112.

Figure 2C:
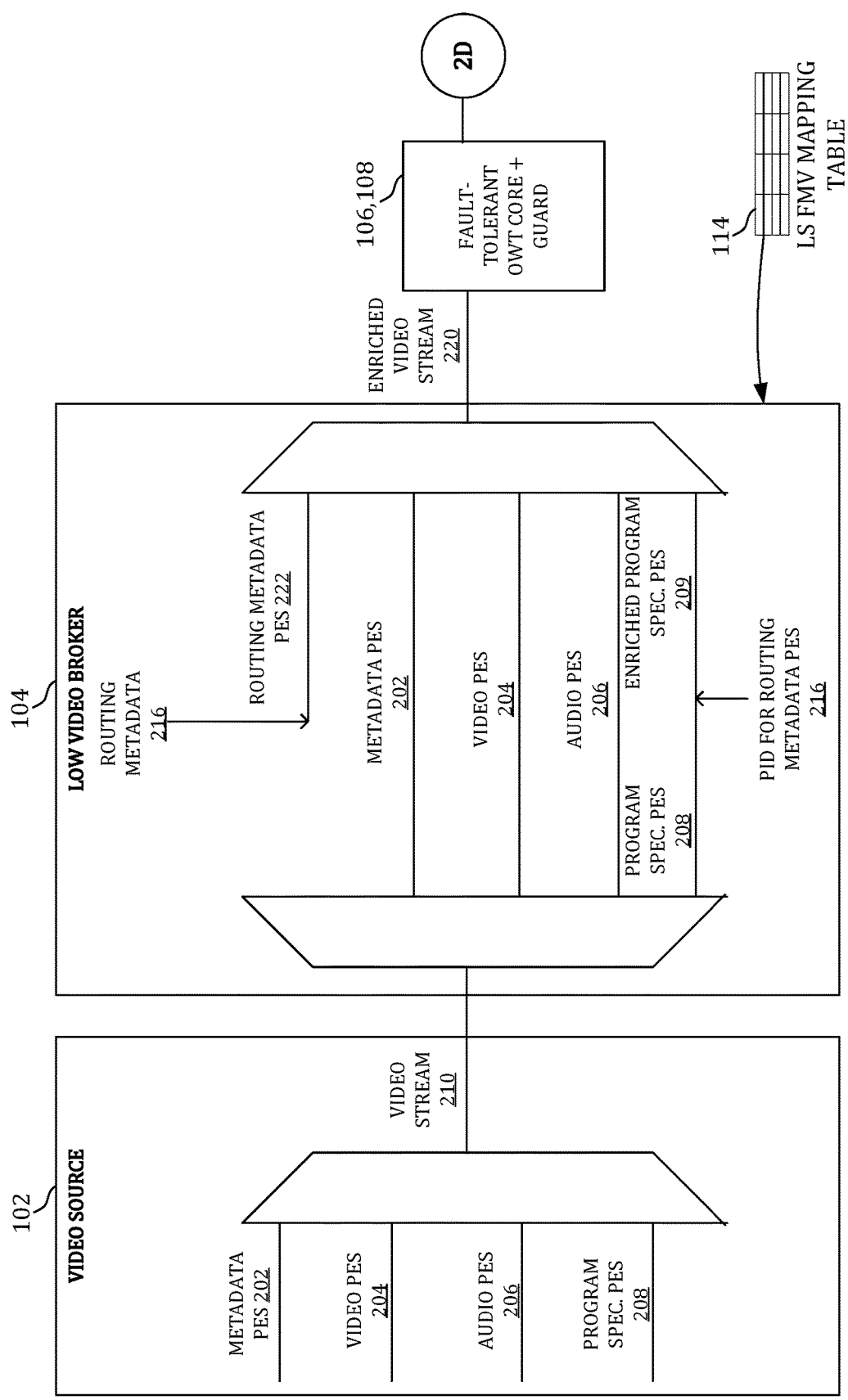
FIGS. 2C-2D depicts an example system for adding a packetized elementary stream (PES) with routing data to a video stream.
Figure 2D:
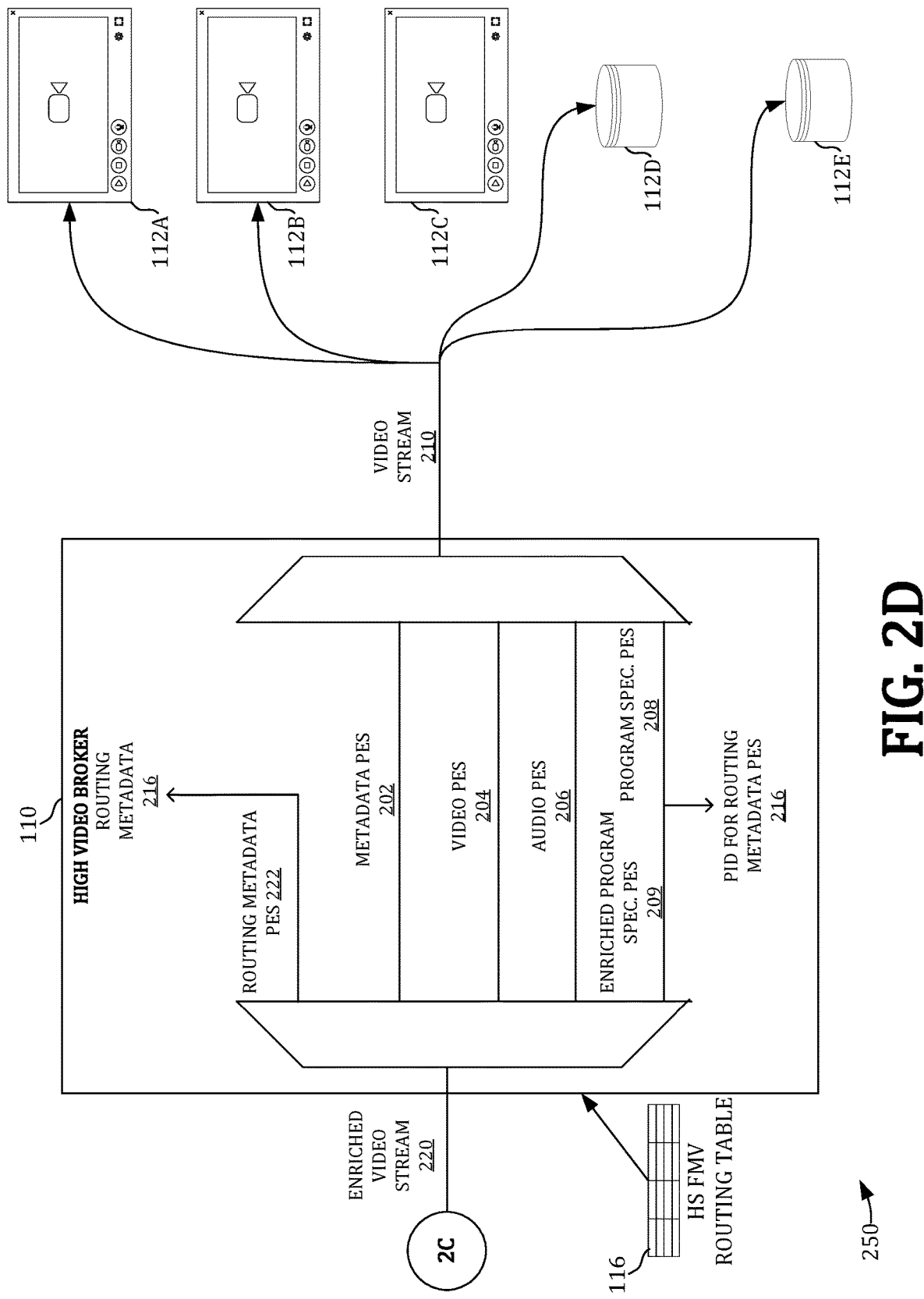

FIGS. 2C-2D depict another example system 250 for adding a PES with routing data to a video stream. The system 250 is similar to the system 200 above with the exception that the system 250 does not modify an already existing PES. Rather, the system 250 adds a new PES that includes the routing data. Such scenarios may occur where there is no metadata PES (e.g., not KLV data) present in the video stream generated by the video source. In a second scenario, the video stream includes a metadata PES (e.g., has KLV data), but the metadata PES cannot be modified or it would be undesirable to modify the metadata PES (e.g., modifying the KLV data would require overwriting useful data). The system 250 and the techniques discuss herein apply to both scenarios, but the example discussed below with respect to FIGS. 2C-2D is provided in light of the second scenario (e.g., where the original video stream already includes a metadata PES).

The video source 102 may operate the same as discussed above by generating a video stream 210 by multiplexing multiple PESs, such as a metadata PES 202, a video content PES 204, an audio PES 206, and a program specific PES 208. The video stream 210 is received by the low video broker 104.

The low video broker 104 demultiplexes the video stream 210. The low video broker 104 also generates a new routing metadata PES 222. The routing metadata PES 222 includes the routing data 216 extracted from the low-side FMV mapping table 114. The routing data 216 may be extracted from the low-side FMV mapping table 114 in the same manners as discussed above. The routing metadata PES 222 may in the form of KLV data and include the routing data 216 in a particular field (e.g., a value for a particular key or values for particular keys).

Because a new PES is being added, the program specific PES 208 is also modified to that the PAT and/or the PMT is updated to indicate the existence of the new routing metadata PES 222 and the PID for the routing metadata PES 222. Determining the particular PID for the new routing metadata PES 222 may be challenging because each video stream 210 received from various video sources 102 may include varying numbers of PESs with varying PIDs. Accordingly, in some examples, the particular PID to be designated for the new routing metadata PES 222 may be set by the customer or administrator when the video streams are first configured (e.g., when a new source-to-destination video stream is requested). When the PAT and/or PMT is modified to include the PID for the new routing metadata PES 222, the program specific PES 208 becomes an enriched program specific PES 209.

The low video broker 104 then multiplexes the PESs to generate an enriched video stream 220. For instance, the low video broker 104 multiplexes the routing metadata PES 222, the metadata PES 202, the video content PES 204, the audio PES 206, and the enriched program specific PES 209 to form the enriched video stream 220. The enriched video stream 220 is transmitted through the fault-tolerant OWT core 106 and the guard 108 to the high video broker 110 (FIG. 2D).

The high video broker 110 demultiplexes the enriched video stream 220. The high video broker 110 inspects the enriched program specific PES 209 to identify the PID of the routing metadata PES 222. With the PID known, the high video broker 110 then identifies and inspects the routing metadata PES 222 to extract the routing data 216, such as the GUID.

The high video broker 110 then removes the routing metadata PES 222 and removes the PID entry from the enriched program specific PES 209 to reform the program specific PES 208 (e.g., the unenriched program specific PES 208). The PESs are then again multiplexed to form an unenriched video stream 210, which may be the same as the original video stream 210 received by the video source 102 by the low video broker 104. For example, the high video broker 110 multiplexes the metadata PES 202, the video content PES 204, the audio PES 206, and the program specific PES 208 to form the unenriched video stream 210.

The high video broker 110 also identifies a destination address (e.g., IP address and/or port) for the video stream 210 based on the extracted GUID and an FMV routing table 116. For example, the high video broker 110 may query the FMV routing table 116 with the extracted GUID, and in response to the query, receive the destination address(es) of the destination device(s) 112 for the video stream 210. The high video broker 110 then transmits the unenriched video stream 210 to the destination address(es) of the destination device(s) 112.

Figure 3:
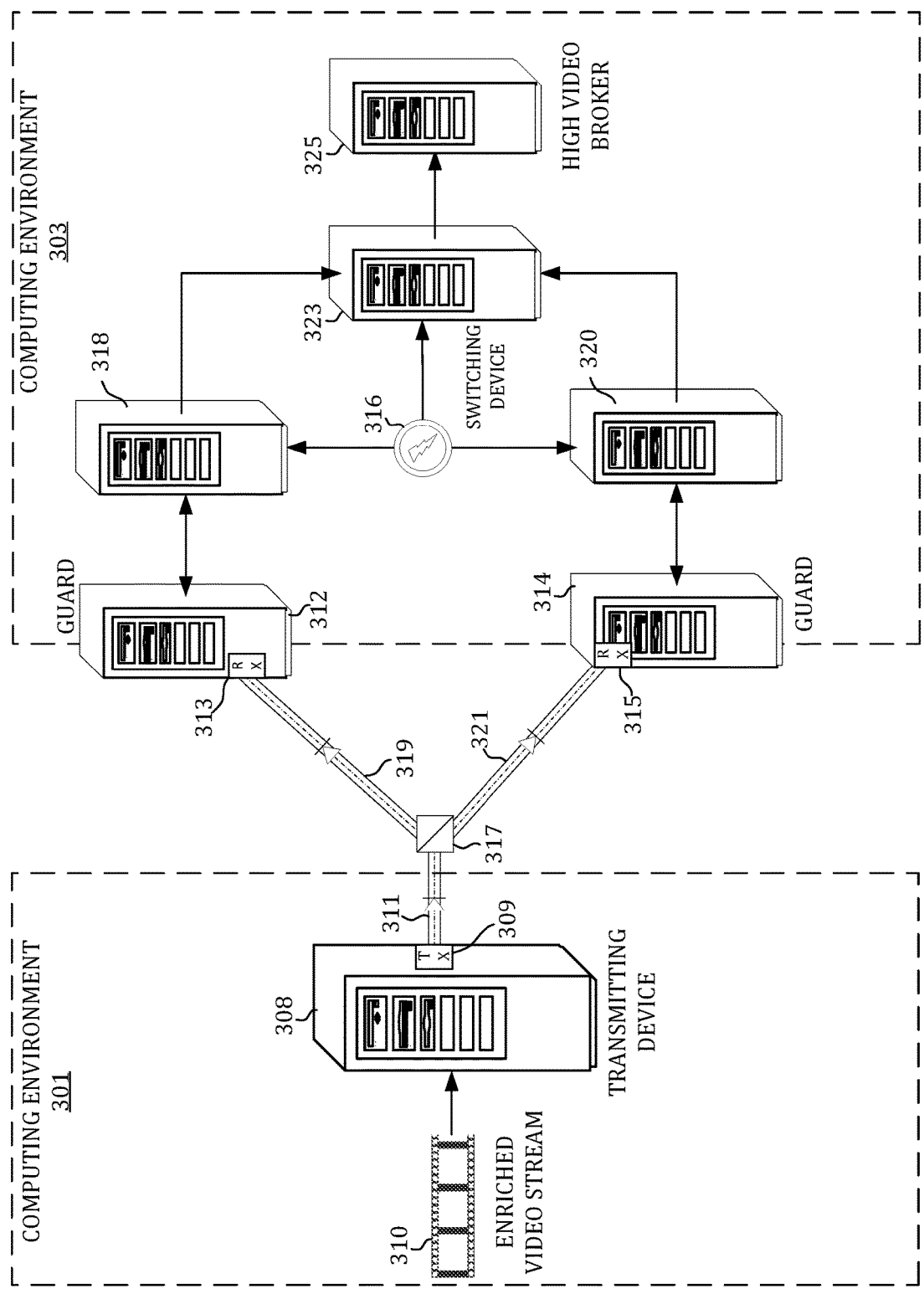
FIG. 3 depicts an example fault-tolerant video streaming core in a one-way transfer system.

FIG. 3 depicts an example fault-tolerant video streaming core 300 in a one-way transfer system. In the example depicted, the core 300 is an example system that includes the fault-tolerant OWT core 106 and the guard 108 of the system 100 of FIG. 1.

FIG. 3 again represents the first computing environment 301 and the second computing environment 303. In the example depicted, the first computing environment 301 includes a computing device 308. The computing device 308 may be referred to herein as the low-side computing device 308 or the transmitting device 308. The low-side computing device 308 receives enriched video streams 310 from the low-side broker (not depicted in FIG. 3). The low-side computing device 308 may serialize the enriched video stream 310 by separating the enriched video stream 310 into one or more data chunks using a file segmentation service or utility, which may be implemented locally on computing device 308 or accessed remotely by computing device 308.

The segmented data of the enriched video stream 310 is then transmitted (e.g., optically) one way to the second computing environment 303. The second computing environment 303 includes computing device 312 and computing device 314. In some examples, computing devices 312 and 314 are located proximate the computing device 308 (e.g., in the same building or room). For instance, computing devices 312, 314 and computing device 308 may be located in the same room of a data center such that computing device 308 is located in a first data rack (e.g., server rack or data cabinet), and the computing devices 312, 314 are located in a second data rack or a different shelf of the first data rack. In such examples, the computing device 308 and the computing devices 312, 314 may be directly connected via point-to-point cabling, which may be optical as discussed further herein.

In some examples, the computing device 312 and the computing device 314 are also physically separated from one another to help ensure reliability and redundancy. For instance, the computing device 312 and the computing device 314 may be in different server racks, different rooms, or different buildings that rely on different power supplies. Accordingly, if power is lost for the computing device 312, power may still remain for the second computing device 314. In other examples, computing devices 312, 314 are located remotely from computing device 308 (e.g., in a different building or room).

The computing devices 312, 314 receive the enriched video stream that is transmitted from the low-side computing device 308. Thus, in some examples, the computing device 312 may be referred to herein as a first receiving device 312, and the computing device 314 may be referred to herein as a second receiving device 314. The receiving devices 312, 314 may also operate as guards, and computing devices 312, 314 may otherwise be referred to as the first guard 312 and the second guard 314 or cross-domain protection devices 312, 314.

Returning to the transmission of data between the low-side computing device 308 and the guards 312, 314, the unidirectional transfer of data from the low-side computing device 308 to the guards 312, 314 may be accomplished optically. The use of optical transmission adds additional speed, reliability, and/or security to the data transfer. In the example depicted, the low-side computing device 308 includes an optical transmitter 309 that converts the segmented data of the enriched video stream 310 into an optical signal that is transmitted into a first optical fiber 311. For instance, the optical transmitter 309 may encode the segmented data of the video stream 310 into a series of light pulses.

In general, fiber optic communication is a method of transmitting information from one location to another using light signals transmitted through optical fibers. Optical fibers are generally thin strands of glass or plastic that are designed to guide light along their length. Optical fibers provide many advantages including high speeds and the ability to transmit data with very little loss of signal strength. In addition, fiber optic communication is more secure than other forms of communication because it is difficult to intercept and tamper with the signals transmitted through optical fibers.

The optical transmitter 309 may be part of a transmit-only NIC or other circuit board that includes transmission-only capabilities. For instance, the circuit board may have no capability to receive optical data. In other examples, if the circuit board does include an optical receiver, no optical fiber from either of the guards 312, 314 is connected to the receiver, and thus no data can be received by the optical receiver. For instance, a transmit-only NIC transmits data to an endpoint but cannot receive data from the endpoint due to the physical severing of the receive pin on the network controller chip of the transmit-only NIC. In some examples, the transmit-only NIC also includes firmware which sets the link state of the transmit-only NIC to always be "up" (e.g., enabled and/or active). In still other examples, a transmit-only circuit is formed by attaching a splitter cable (e.g., y-splitter cable), where the transmission signal is split into two cables and one of the cables is directed back to the optical receiver of the transmitter circuit, which establishes a layer-1 link state and causes the circuit to sense a return data path even though no return data path actually exists. In yet other examples, a field-programmable gate array (FPGA) or similar device may be configured to restrict data flow to be only unidirectional (e.g., transmit-only). Where the one-way communication is required by the physical components (rather than software-defined constraints), the one-way communication is considered to be physically enforced.

The optical signal generated from the optical transmitter 309 is then split by a beam splitter 317. The beam splitter 317 splits the optical signal (e.g., splits the light transmitted through the first optical fiber 311) into multiple optical signals. In the example depicted, the optical signal is split into two divided optical signals. One of the divided optical signals is passed into a first receiving optical fiber 319, and the other divided optical signal is passed into a second receiving optical fiber 321. Each of the divided optical signals replicates the original optical signal and therefore includes the sample data as the original optical signal. While the optical signal is split into two optical signals in this example, the light may be split into additional signals in different examples.

In some examples, the beam splitter 317 is a passive splitter that that does not require electrical power. For instance, when the light enters the beam splitter 317 from the first optical fiber 311, the light is split into the first receiving optical fiber 319 and the second receiving optical fiber 321 without the need for additional power. The passive beam splitter 317 utilizes reflective and/or refractive properties of its materials to cause the light to be split, such as by using two glass prisms that are adhered or otherwise connected to one another to create a partially reflective surface, a half-silvered mirror, a dichroic mirrored prism, or other suitable designs for splitting a beam of light.

By utilizing a passive beam splitter 317, additional reliability is also introduced into the system because the passive beam splitter 317 requires no power to operate. In other examples, however, an active or powered beam splitter 317 may be utilized. In some examples, the beam splitter 317 is positioned within the first computing environment 301 or the second computing environment 303. For instance, the beam splitter 317 may be a part of the low-side computing device 308 and/or part of the optical transmitter 309. In other examples, the beam splitter 317 is positioned in the second computing environment 303. For example, the beam splitter 317 may be incorporated into the guard 312, the second guard 314, and/or another device of the second computing environment 303.

While the beam splitter 317 is primarily discussed herein as being a passive beam splitter, the beam splitter 317 may include other devices that split and/or duplicate the optical signals, and the beam splitter 317 may also be powered in some examples. For instance, the beam splitter 317 may include a switch with a Switched Port Analyzer (SPAN) port. The SPAN port creates a copy or duplicate of the data that can then be sent to another destination. As a result, a SPAN port may also be referred to as a mirror port in some examples. The duplicate is created by monitoring a source port and duplicating the data that is received on the source port. The beam splitter 317 may also be in the form of a Test Access Point (TAP). A TAP is a passive hardware device that splits or copies the data via beam splitter or passive optical coupler that splits the optical signals into two separate paths.

The divided optical signals are then received by the first guard 312 and the second guard 314 in parallel, respectively. More specifically, the divided optical signal propagating through the first receiving optical fiber 319 is received by a first optical receiver 313 of the first guard 312 that is coupled to the first receiving optical fiber 319. The divided optical signal propagating through the second receiving optical fiber 321 is received by a second optical receiver 315 of the second guard 314 coupled to the second receiving optical fiber 321. The optical receivers 313, 315 convert the optical signal into an electrical data signal that is the substantially the same as the electrical signal representing the segmented data of the video stream 310 that was provided to the optical transmitter 309. The electrical data signal representing the segmented data of the video stream 310 may then be processed by the first guard 312 and the second guard 314 as discussed herein. Effectively, duplicate enriched video streams are thus received by the guards 312, 314.

If the first guard 312 determines that the enriched video stream 310 meets the requirements of the second computing environment 303 (as discussed above), the first guard 312 transcodes and transmits the enriched video stream to the first landing device 318. Similarly, if the second guard 314 determines that the enriched video stream meets the requirements of the second computing environment, the second guard 314 transmits and transcodes the video stream to the second landing device 320. Accordingly, if both guards 312, 314 are functioning properly and transmit the enriched video stream 310, the landing devices 318, 320 receive duplicate video streams 310.

Because the enriched video stream 310 that is transmitted from the first computing environment 301 to the second computing environment 303 is done so in a unidirectional manner, no acknowledgements, or requests for video stream (or portions thereof) to be resent, can be transmitted back to the first computing environment 301 from the second computing environment 303. For example, if the first guard 312 or the first landing device 318 were to stop operating (e.g., system crash, power loss), the low-side computing device 308 would have no way of determining devices are no longer functioning correctly. To help ensure that video stream received by the second computing environment 303 is handled and processed with a high fidelity, the second guard 314 and the second landing device 320 provide data redundancy to the first guard 312 and the first landing device 318 for the video stream 310 that is transferred from the first computing environment 301 to the second computing environment 303. Thus, even if one of the guard 312 or the second guard 314 (and/or the first landing device 318 or the second landing device 320) becomes inoperable, the other device is still able to process the video stream 310.

To provide such data redundancy, the first landing device 318 and the second landing device 320 may be in communication with one another, which may be bidirectional communication (e.g., TCP) or unidirectional communication depending on the implementation. In examples, the communicated data is referred to as performance data 316.

The performance data 316 indicates the performance and/or status of the particular device from which it was sent and/or data about the video stream that is being processed. For example, performance data 316 from the first landing device 318 indicates the status or performance of the first landing device 318. Performance data 316 from the second landing device 320 indicates the status or performance of the second landing device 320. In some examples, the performance data 316 also provides status data about the respective guards. For instance, the performance data 316 from the first landing device 318 may also indicate operating status data of the first guard 312. The performance data 316 may also include operating status data of the second guard 314. Thus, based on the status data 316, each of the first landing device 318 and the second landing device 320 is able to determine if the other device is functioning properly.

The first landing device 318 and/or the second landing device 320 use the performance data 316 to change its operating state and determine which of the first landing device 318 or the second landing device 320 is the source of the enriched video stream 310 that is provided to the high video broker 325.

In some examples, the performance data 316 includes information such as uptime, processing speed, bandwidth utilization, etc. Alternatively or additionally, the performance data 316 may include transmission information for one or more time periods. Examples of transmission information include the quantity of data transmitted during the time period, a list of data chunks, data segments, or packets transmitted for the video stream, data transmission metrics (e.g., average or maximum time to transfer video stream packets), the number of packets lost during transmission, and the current role or operating state of the computing device (e.g., primary device or secondary device).

The performance data 316 may also include data specific to the enriched video stream 310 that is being processed by the first landing device 318 and the second landing device 320. For example, the performance data 316 may include data based on a continuity counter for the video stream 310. A continuity counter is a mechanism used in video streaming to ensure the correct ordering and consistency of data packets as they are transmitted across a network. For instance, one example of a continuity counter may be used with the MPEG-TS format.

For video streams in the MPEG-TS format, a continuity counter is a 4-bit field in the header of each Transport Stream Packet (TSP). The counter is incremented by 1 for each successive packet that carries a payload belonging to the same Packetized Elementary Stream (PES), which represents a single video, audio, or data stream within the transport stream. The continuity counter provides a way to identify and manage packet loss, duplication, or reordering that may occur during transmission. In some examples, the counter is incremented between 1-16 and then reset to 1 for the following packet. In the present technology, the first landing device 318 and the second landing device 320 may also create a secondary counter that indicates which set of continuity counters is being received. The first set of 16 counts/packets may then be distinguished from the second set (and other subsequent sets) of 16 counts/packets.

As some additional detail, when the video stream 310 is initially encoded in the first computing environment 301, the video stream 310 is broken down into smaller chunks and encapsulated into Transport Stream Packets (TSPs) for transmission. Each TSP has a header that contains information about the packet, such as the Packet Identifier (PID) that uniquely identifies the PES to which the packet belongs and the continuity counter that tracks the packet sequence within the ES. As packets are transmitted, the continuity counter in the TSP header is incremented for each successive packet belonging to the same ES.

Each of the first landing device 318 and the second landing device 320 may check the continuity counter of each received TSP. If the counter values are in the expected sequence, the first landing device 318 and the second landing device 320 may assume that the packets have arrived in the correct order without loss or duplication. If the continuity counter values are out of sequence, the first landing device 318 and the second landing device 320 may detect packet loss, duplication, or reordering.

The result of the analysis of the continuity counter by the first landing device 318 and/or the second landing device 320 may be included in the performance data 316. In some examples, the continuity counter of each packet processed by the first landing device 318 and/or the second landing device 320 is included in the performance data 316. For instance, when the first landing device 318 processes a particular packet, the performance data 316 may indicate the continuity counter value for the packet an indicator that the packet was processed by the first landing device 318.

In some examples, the first landing device 318 and the second landing device 320 operate as either a primary device or a secondary device. The primary device transmits the video data 310 further through the system, such as to the high video broker 325. The secondary device does not transmit the received data further through the system. For instance, the secondary device may ultimately drop (e.g., delete or discard) the video stream data it has received. In other examples, the secondary device stores a copy of the video stream 310 for backup or restoration purposes.

The designation of whether the first landing device 318 or the second landing device 120 is the primary device or the secondary device depends on the performance data 316. In some examples, one of the landing devices 318, 320 may be designated as the primary device for all incoming video streams until that performance data 316 indicates that the primary device is no longer functioning properly. For example, the first landing device 318 may be initially designated as the primary device, and the second landing device 320 may be designated as the secondary device.

In such examples, the first landing device 318 retains its primary device operating status until the second landing device 320 is no longer functioning or is no longer functioning correctly. Criteria for determining whether the first landing device 318 is functioning correctly may be based on the performance metrics of the first landing device 318, which may be represented in the performance data 316. For instance, the health data and/or transmission information may be compared to one or more thresholds to determine if the first landing device 318 is functioning properly or within acceptable limits. If no performance data 316 is received (e.g., due to the first landing device 318 being down), the performance data 316 may be considered outside of the threshold and therefore indicate the non-functionality of the first guard 312. Such a determination may be made by the second landing device 320 based on the performance data 316 that is received from the first landing device 318. Additionally or alternatively, if the first landing device 318 does not receive performance data 316 from the first landing device 318 from within a timeout period (e.g., a set duration), the second landing device 320 determines that the first landing device 318 is not functioning properly.

When the second landing device 320 determines that the first landing device 318 is not functioning properly based on the performance data 316 (or lack thereof), the second landing device 320 changes its operating state from the secondary device to the primary device and becomes the source for the video stream 310 to subsequent devices, such as the high video broker 325. If the first landing device 318 is still partially operational, the second landing device 320 may indicate the operating state change to the first guard 312 as part of the performance data 316. When the second landing device 320 is operating as the primary device, the second guard 314 transmits the video stream further through the system (e.g., to high video broker 325), and first landing device 318 does not further transmit the data.

While the second landing device 320 is operating as the primary device, the second landing device 320 may continue to transmit performance data 316 to the first landing device 318. In examples where the first landing device 318 is still operating (but at a degraded performance), the first landing device 318 may also continue transmitting the performance data 316 to the second landing device 320. In some examples, the second landing device 320 continues to operate as the primary device even where the first landing device 318 regains its proper or acceptable performance (as indicated by the performance data 316). In such examples, the first landing device 318 may transition back to the primary device when the performance data 316 indicates that the second landing device 320 is no longer functioning properly. The determination that the second landing device 320 is not functioning properly may be similar to the determination relating to proper functioning of the first landing device 318 discussed above. For instance, the first landing device 318 may compare the performance data 316 from the second landing device 320 to one or more thresholds to determine if the second landing device 320 is functioning properly.

In other examples, the second landing device 320 may revert to the secondary device upon detecting that the first landing device 318 has regained functionality. The first landing device 318 then resumes its operating state as the primary device. For example, based on the performance data 316, the second landing device 320 may determine that the first landing device 318 has resumed proper functionality. The second landing device 320 may then transmit a message (e.g., as part of the performance data 316) that indicates the first landing device 318 is to resume operating as the primary device and the second landing device 320 is switching its operating state to the secondary device.

The switching of operating states may occur rapidly, and in some examples, the switching may occur within less than 100 milliseconds (ms). In some examples, the switching occurs on a packet-by-packet basis. For instance, if the second landing device 320 is operating as a secondary device and receives a particular TS packet having a particular continuity count value and the performance data 316 indicates that the first landing device 318 did not process that particular packet, the second landing device 320 transmits the particular packet. The transmission of the particular packet may then be indicated in the performance data 316. The first landing device 318 may retain operating status as the primary device for subsequent packets or the second landing device 320 may switch to the primary device for subsequent packets until there is another packet that is processed by one landing device but not the other.

In some examples, the landing devices 318, 320 do not change operating states. Rather, both the landing devices 318, 320 may transmit the duplicate enriched video streams to a switching device 323. The performance data 316 from each the landing devices 318, 320 may also be provided to the switching device 323. The switching device 323 then switches between a primary enriched video stream (e.g., the enriched video stream from the first landing device 318) and the secondary enriched video stream (e.g., the enriched video stream from the second landing device 320) and provides a single enhanced video stream to the high video broker 325.

The switching device 323 effectively treats the duplicate video streams 310 coming from the first landing device 318 and the second landing device 320 as a primary video stream and a secondary video stream. The primary video stream is provided to the high video broker until an interruption to the primary video stream is detected. When the interruption is detected, the secondary stream is then transmitted to the high video broker 325.

An interruption in the primary video stream may be based on the continuity counter of the video stream and/or of the from performance data 316. For instance, when an expected packet of the video stream 310 is not received as part of the primary video stream, the switching device 323 may rapidly switch to the secondary video stream and provide the secondary video stream to the high video broker 325. The switching device 323 may continue to provide the secondary video stream to the high video broker 325 until an interruption in the secondary video stream is detected by the switching device 323. When the detection in the secondary video stream is detected, the switching device 323 then switches back to the primary video stream. Because the switching device 323 is concurrently receiving the primary and secondary video streams, the switching device 323 switches to the video stream that has the least interruptions or generally least frequent number of dropped packets. The switching between the primary video stream and the secondary video stream may be performed rapidly (e.g., 100 ms or less). For instance, in some examples, switching occurs on a packet-by-packet basis.

The switching between the primary video stream and the secondary video stream may also be based on the performance data 316, such as health data of the first landing device 318 or the second landing device 320. For instance, if the performance data 316 indicates a performance degradation of the first landing device 318, the switching device 323 may switch to the secondary video stream even where the primary video stream has not yet encountered any interruptions.

Figure 4A:
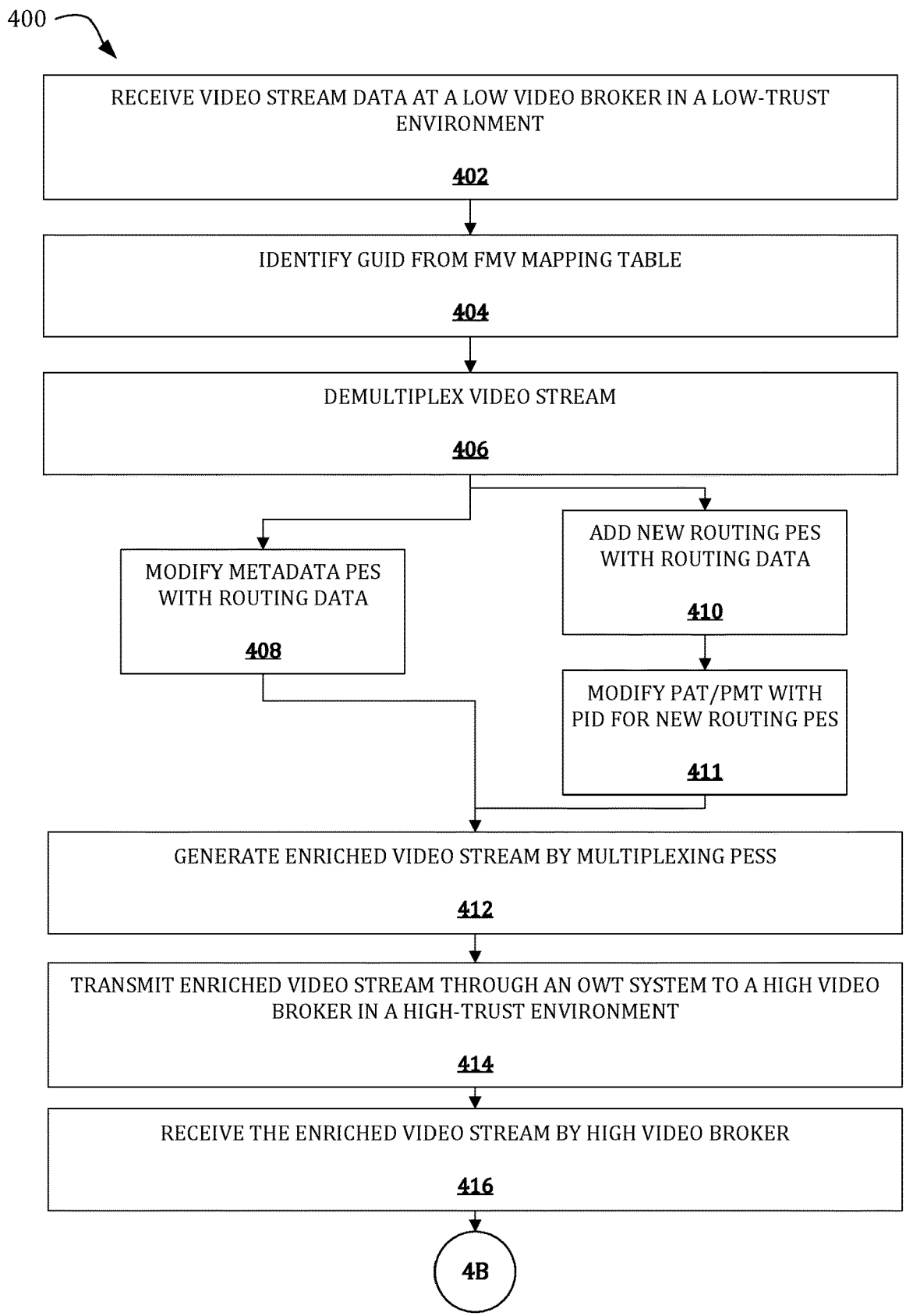
FIGS. 4A-4B depict an example method for full-motion video routing by modifying elementary streams of video streams.
Figure 4B:
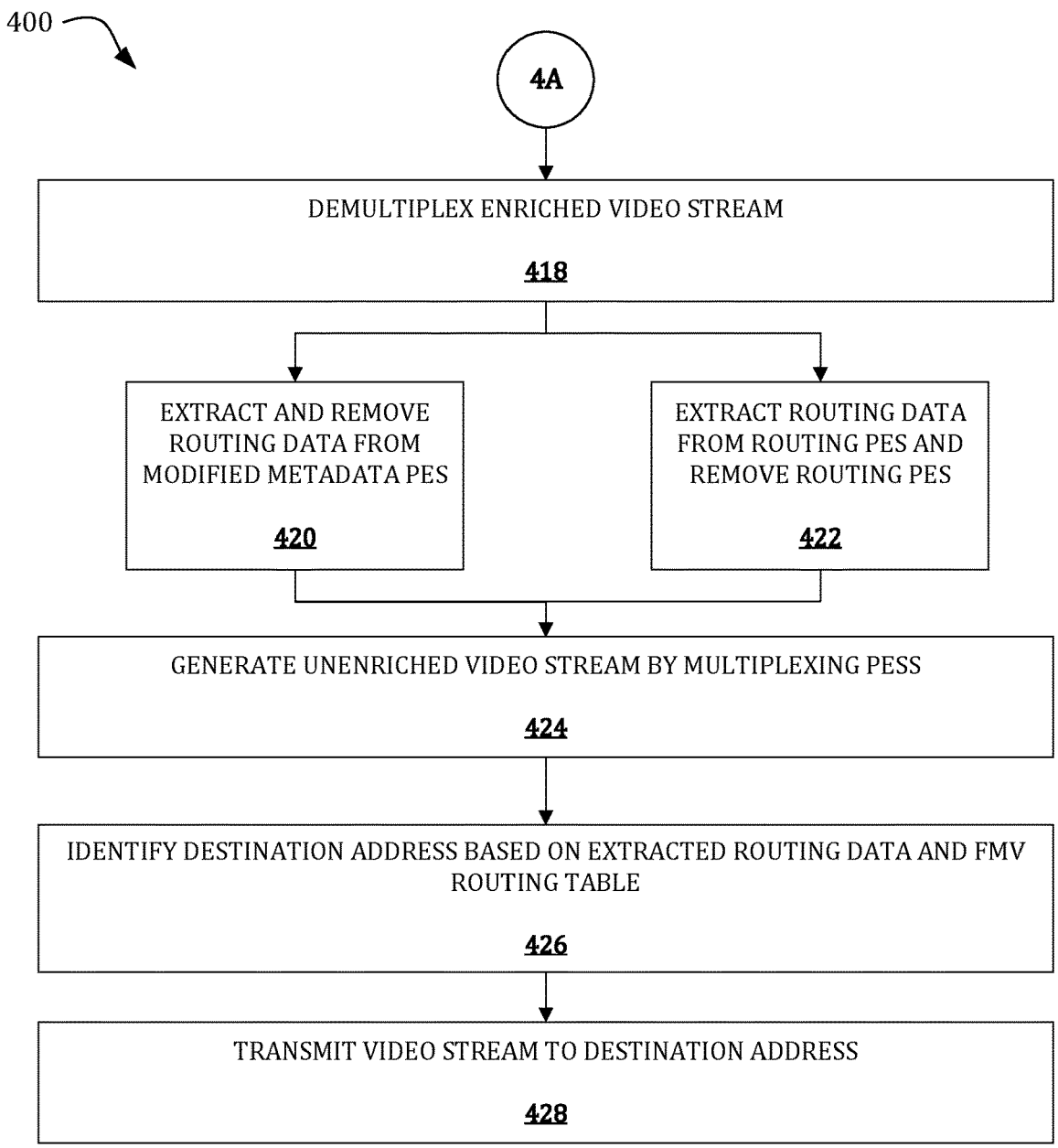

FIGS. 4A-4B depicts an example method 400 for full-motion video routing by modifying the video stream. The method 400 may be performed by one or more of the devices discussed above, such as one or more of the devices shown in FIGS. 1-3.

At operation 402, live video stream data is received by a low video broker in a low-trust environment. The live video stream may be received from a video source in the low-trust environment.

At operation 404, the low video broker accesses an FMV mapping table that includes GUIDs for different streams having particular source addresses or received on a particular port. The low video broker identifies the GUID for the received video stream based on the address of the video stream or the port on which the video stream was received by the low video broker.

At operation 406, the low video demultiplexes the video stream to access the PESs in the video stream, such as the various PESs discussed above. Operation 408 or operation 410 may then be performed. At operation 408, a metadata PES of the video stream is modified to incorporate the GUID and/or other routing data identified in operation 404. For example, one or more values of KLV fields in the metadata PES may be modified. Modifying the metadata PES to incorporate the GUID results in an enriched metadata PES.

Alternatively, at operation 410, a new routing PES with the GUID and/or other routing data is generated. Where operation 410 is performed, operation 411 may also be performed. At operation 411, the PAT and/or PMT of the video stream is modified to incorporate the PID of the new routing PES.

At operation 412, an enriched data stream is generated by multiplexing the PESs of the video stream including either the enriched metadata PES (where operation 408 is performed) or the new routing PES (where operation 410 is performed). For instance, the audio PES and the video content PES are multiplexed with the enriched PES or the new routing PES to generate the enriched data stream.

At operation 414, the enriched video stream is transmitted by the low video broker through an OWT system to a high video broker in a high-trust environment. The high video broker receives the enriched video stream at operation 416. At operation 418, the high video broker demultiplexes the enriched video stream to access the PESs of the enriched video stream. Depending on whether operation 408 or operation 410 was performed, either operation 420 or operation 422 is performed.

If operation 408 was performed, then operation 420 is performed. At operation 420, the routing data (e.g., the GUID) is extracted from the enriched metadata PES. Operation 420 may also include removing the routing data from the enriched metadata PES to form an unenriched metadata PES.

If operation 410 was performed, the high video broker extracts the routing data (e.g., GUID) from the routing PES. Extracting the routing data may also include inspecting the modified PAT and/or PMT to identify the PID of routing PES. Once identified, the routing PES may be inspected to identify the routing data. Operation 422 may also include removing the routing PES so that it is not multiplexed into the video stream that is transmitted from the high video broker.

At operation 424, the high video broker multiplexes the PESs to form an unenriched video stream. For instance, the high video broker may multiplex the video content PES, the audio PES, and the unenriched metadata PES to generate the unenriched video stream. In other examples, the PESs of the original video stream are multiplexed without the routing PES to form the unenriched video stream. The unenriched video stream may be same as, or substantially similar to the original video stream received by the low side video broker.

At operation 426, a destination address (e.g., IP address or port) for the video stream is identified based on the extracted GUID and an FMV routing table. For example, the high video broker may query the FMV routing table with the extracted GUID, and in response to the query, receive the destination address(es) of the destination device(s) for the video stream. At operation 428, the high video broker transmits the video stream (without the metadata inserted by low video broker) to the destination device(s) having the destination address(es).

Figure 5:
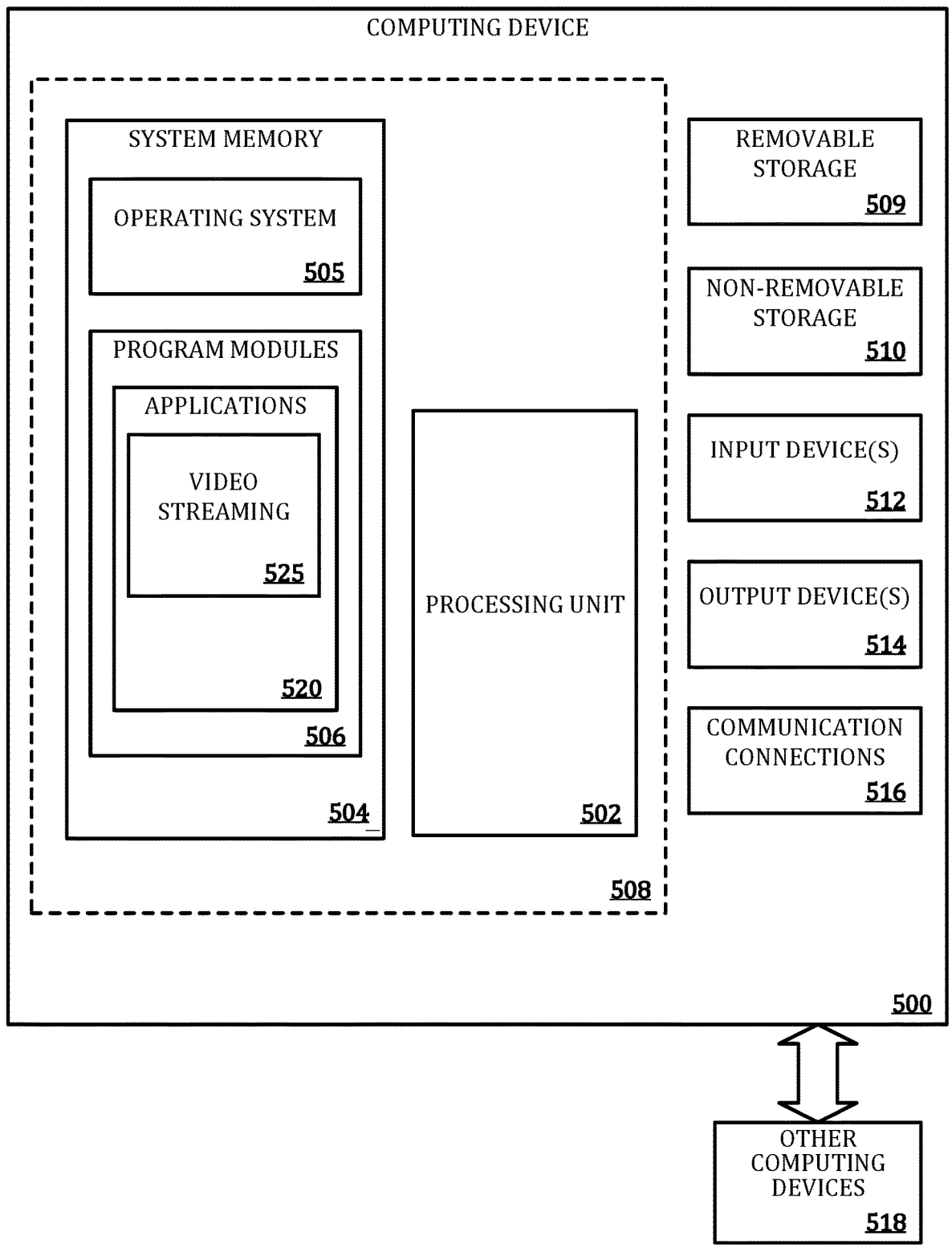
FIG. 5 is a block diagram illustrating example physical components of a computing device for practicing aspects of the disclosure.

FIG. 5 is a block diagram illustrating physical components (e.g., hardware) of a computing device 500 with which aspects of the disclosure may be practiced. The computing device components described below may be suitable for the computing devices and systems described above, such as the video brokers, guards, landing devices, switching devices, etc. In a basic configuration, the computing device 500 includes at least one processing unit 502 and a system memory 504. Depending on the configuration and type of computing device, the system memory 504 may comprise volatile storage (e.g., random access memory (RAM)), non-volatile storage (e.g., read-only memory (ROM)), flash memory, or any combination of such memories.

The system memory 504 includes an operating system 505 and one or more program modules 506 suitable for running software applications 520, such as one or more components supported by the systems described herein. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, or optical disks. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., applications 520) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc. For instance, the applications 520 may include a video routing application 525 that performs the operations discussed herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for routing video streams in a one-way transfer (OWT) system. The system includes a source video broker, in a source computing environment, that: receives a video stream on an ingress port at an ingress Internet Protocol (IP) address; accesses a mapping table storing unique identifiers for video streams based on the corresponding ingress IP addresses and ports of the video streams; based on the ingress port and IP address of the video stream, identifies a unique identifier for the video stream; demultiplexes the video stream to access packetized elementary streams (PESs) of the video stream, the PESs including a metadata PES and a video content PES; forms an enriched metadata PES by modifying the metadata PES to include the unique identifier; forms an enriched video stream by multiplexing the video content PES and the enriched metadata PES; and transmits the enriched video stream through the OWT system. The system also includes a destination video broker, in a destination computing environment protected by the OWT system, that: receives the enriched video stream; accesses the enriched metadata PES by demultiplexing the enriched video stream; extracts the unique identifier from the enriched metadata PES; based on the extracted unique identifier, identifies a destination address for the video stream from a routing table that stores corresponding destination addresses for multiple unique identifiers; forms an unenriched video stream by multiplexing the metadata PES and the video content PES; and transmits the unenriched video stream to a destination device having the destination address.

In an example, the destination video broker also removes the unique identifier from the enriched metadata PES. In another example, the source computing environment is a low-trust environment and destination computing environment is a high-trust computing environment. In still another example, the metadata PES includes key-length-value (KLV) data. In a further example, modifying the metadata PES includes modifying a value of the KLV data.

In another aspect, the technology relates to method for routing video streams in a one-way transfer (OWT) system. The method includes receiving, by a source video broker in a source computing environment, a video stream; identifying, by the source video broker, a unique identifier for the video stream; accessing packetized elementary streams (PESs) of the video stream by demultiplexing the video stream; generating a routing PES including the unique identifier; forming an enriched video stream by multiplexing the PESs and the routing PES; transmitting, by the source video broker, the enriched video stream through the OWT system; receiving, by a destination video broker in a destination computing environment, the enriched video stream; accessing the routing PES by demultiplexing the enriched video stream; extracting the unique identifier from the routing PES; forming an unenriched video stream by multiplexing the PESs without the routing PES; based on the extracted unique identifier, identifying, by the destination video broker, a destination address for the video stream; and transmitting, by the destination video broker, the unenriched video stream to a destination device having the destination address.

In an example, identifying the unique identifier, by the source video broker, includes accessing a mapping table storing unique identifiers for video streams based on corresponding ingress IP addresses and ingress ports of the video streams; and identifying the unique identifier for the video stream based on an ingress address and ingress port for the video stream. In still another example, identifying, by the destination video broker, the destination address, includes: accessing a routing table that stores corresponding destination addresses for multiple unique identifiers; querying the routing table with the unique identifier; and receiving, in response to the query, the destination address. In yet another example, the routing PES includes key-length-value (KLV) data. In a further example, the unique identifier is stored as a value in the KLV data.

In another example, the source computing environment is a low-trust environment and destination computing environment is a high-trust computing environment. In still another example, the video stream is in a Moving Picture Experts Group (MPEG)-Transport Stream (TS) format. In yet another example, the video stream received by the source video broker includes a metadata PES. In still yet another example, the video stream received by the source video broker does not include a metadata PES.

In another aspect, the technology relates to a method for routing video streams in a one-way transfer (OWT) system. The method includes receiving, by a source video broker in a source computing environment, a video stream having a source address; based on the source address of the video stream, identifying, by the source video broker, a unique identifier for the video stream; accessing packetized elementary streams (PESs) of the video stream by demultiplexing the video stream; performing one of: generating a routing PES including the unique identifier; or forming an enriched metadata PES by modifying a metadata PES of the video stream; forming an enriched video stream by multiplexing the routing PES or the enriched metadata PES with other PESs of the video stream; and transmitting, by the source video broker, the enriched video stream through the OWT system to a destination video broker.

In an example, the routing PES is generated and included in the enriched video stream. In another example, the enriched metadata PES is formed and included in the enriched video stream. In still another example, the enriched metadata PES includes key-length-value (KLV) data, and the unique identifier is stored as a value in the KLV data. In yet another example, identifying the unique identifier, by the source video broker, includes accessing a mapping table storing unique identifiers for video streams based on source addresses of the video streams; and identifying the unique identifier for the video stream based on the source address for the video stream. In still yet another example, the video stream is in a Moving Picture Experts Group (MPEG)-Transport Stream (TS) format.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for routing video streams in a one-way transfer (OWT) system, the system comprising:
 a source video broker, in a source computing environment, that:
  receives a video stream on an ingress port at an ingress Internet Protocol (IP) address;
  accesses a mapping table storing unique identifiers for video streams based on the corresponding ingress IP addresses and ports of the video streams;
  based on the ingress port and IP address of the video stream, identifies a unique identifier for the video stream;
  demultiplexes the video stream to access packetized elementary streams (PESs) of the video stream, the PESs including a metadata PES and a video content PES;
  forms an enriched metadata PES by modifying the metadata PES to include the unique identifier;
  forms an enriched video stream by multiplexing the video content PES and the enriched metadata PES; and
  transmits the enriched video stream through the OWT system; and
 a destination video broker, in a destination computing environment protected by the OWT system, that:
  receives the enriched video stream;
  accesses the enriched metadata PES by demultiplexing the enriched video stream;
  extracts the unique identifier from the enriched metadata PES;
  based on the extracted unique identifier, identifies a destination address for the video stream from a routing table that stores corresponding destination addresses for multiple unique identifiers;
  forms an unenriched video stream by multiplexing the metadata PES and the video content PES; and
  transmits the unenriched video stream to a destination device having the destination address.

2. The system of claim 1, wherein the destination video broker also removes the unique identifier from the enriched metadata PES.

3. The system of claim 1, wherein the source computing environment is a low-trust environment and destination computing environment is a high-trust computing environment.

4. The system of claim 1, wherein the metadata PES includes key-length-value (KLV) data.

5. The system of claim 4, wherein modifying the metadata PES includes modifying a value of the KLV data.

6. A method for routing video streams in a one-way transfer (OWT) system, the method comprising:
 receiving, by a source video broker in a source computing environment, a video stream;
 identifying, by the source video broker, a unique identifier for the video stream;
 accessing packetized elementary streams (PESs) of the video stream by demultiplexing the video stream;
 generating a routing PES including the unique identifier;
 forming an enriched video stream by multiplexing the PESs and the routing PES;
 transmitting, by the source video broker, the enriched video stream through the OWT system;
 receiving, by a destination video broker in a destination computing environment, the enriched video stream;
 accessing the routing PES by demultiplexing the enriched video stream;
 extracting the unique identifier from the routing PES;
 forming an unenriched video stream by multiplexing the PESs without the routing PES;
 based on the extracted unique identifier, identifying, by the destination video broker, a destination address for the video stream; and
 transmitting, by the destination video broker, the unenriched video stream to a destination device having the destination address.

7. The method of claim 6, wherein identifying the unique identifier, by the source video broker, comprises:
 accessing a mapping table storing unique identifiers for video streams based on corresponding ingress IP addresses and ingress ports of the video streams; and
 identifying the unique identifier for the video stream based on an ingress address and ingress port for the video stream.

8. The method of claim 6, wherein identifying, by the destination video broker, the destination address, comprises:
 accessing a routing table that stores corresponding destination addresses for multiple unique identifiers;
 querying the routing table with the unique identifier; and
 receiving, in response to the query, the destination address.

9. The method of claim 6, wherein the routing PES includes key-length-value (KLV) data.

10. The method of claim 9, wherein the unique identifier is stored as a value in the KLV data.

11. The method of claim 6, wherein the source computing environment is a low-trust environment and destination computing environment is a high-trust computing environment.

12. The method of claim 6, wherein the video stream is in a Moving Picture Experts Group (MPEG)-Transport Stream (TS) format.

13. The method of claim 6, wherein the video stream received by the source video broker includes a metadata PES.

14. The method of claim 6, wherein the video stream received by the source video broker does not include a metadata PES.

15. A method for routing video streams in a one-way transfer (OWT) system, the method comprising:
 receiving, by a source video broker in a source computing environment, a video stream having a source address;
 based on the source address of the video stream, identifying, by the source video broker, a unique identifier for the video stream;
 accessing packetized elementary streams (PESs) of the video stream by demultiplexing the video stream;
 performing one of:
  generating a routing PES including the unique identifier; or
  forming an enriched metadata PES by modifying a metadata PES of the video stream;
 forming an enriched video stream by multiplexing the routing PES or the enriched metadata PES with other PESs of the video stream; and
 transmitting, by the source video broker, the enriched video stream through the OWT system to a destination video broker.

16. The method of claim 15, wherein the routing PES is generated and included in the enriched video stream.

17. The method of claim 15, wherein the enriched metadata PES is formed and included in the enriched video stream.

18. The method of claim 15, wherein the enriched metadata PES includes key-length-value (KLV) data, and the unique identifier is stored as a value in the KLV data.

19. The method of claim 15, wherein identifying the unique identifier, by the source video broker, comprises:
   accessing a mapping table storing unique identifiers for video streams based on source addresses of the video streams; and
   identifying the unique identifier for the video stream based on the source address for the video stream.

20. The method of claim 15, wherein the video stream is in a Moving Picture Experts Group (MPEG)-Transport Stream (TS) format.

* * * * *